US006543704B2

(12) United States Patent
Stephens

(10) Patent No.: US 6,543,704 B2
(45) Date of Patent: Apr. 8, 2003

(54) SPRINKLER HEAD AND RISER PROTECTOR

(76) Inventor: Michael A. Stephens, 3880 Ortega Blvd., Jacksonville, FL (US) 32210

( * ) Notice: Subject to any disclaimer, the term of this patent is extended or adjusted under 35 U.S.C. 154(b) by 0 days.

(21) Appl. No.: 09/780,707

(22) Filed: Feb. 12, 2001

(65) Prior Publication Data

US 2001/0032890 A1 Oct. 25, 2001

Related U.S. Application Data

(60) Provisional application No. 60/191,122, filed on Mar. 22, 2000.

(51) Int. Cl.[7] ............ A01G 25/06
(52) U.S. Cl. ............ 239/201; 239/288.5
(58) Field of Search ............ 239/288, 288.3, 239/288.5, 200–206

(56) References Cited

U.S. PATENT DOCUMENTS 4,350,296 A * 9/1982 Kuhlman et al. ........... 239/201
5,772,118 A * 6/1998 Fabiano ...................... 239/276

* cited by examiner

*Primary Examiner*—Lisa A. Douglas
(74) *Attorney, Agent, or Firm*—Arthur G. Yeager

(57) ABSTRACT

A protecter for a riser connected to an underground water pipe and sprinkler head attached at a top portion thereof includes an elongate hollow body member having an upper portion with an upper opening and a lower portion with a lower opening, each opening being defined by a rim on respective upper and lower portion. The body defines an interior space for housing a riser and sprinkler head therein and has a lower portion including a pair of slots formed therein for fitting the body over an underground water pipe, and an upper portion further including a concave hood member extending laterally outwardly and downwardly of the rim of the upper opening and defining a cavity. The hood member has a lower edge portion for engaging a ground surface to limit downward travel of the protecter. The slots have an open lower portion and an arcuate upper portion for engaging the upper surface of an underground water pipe. The protecter also includes a plurality of spaced flanges extending beneath the hood member and engaged with the body to inhibit rotative motion of the hood member by positioning the flanges into a ground surface. The lower edge portion is located in a plane beneath an underground water pipe.

20 Claims, 3 Drawing Sheets

SPRINKLER HEAD AND RISER PROTECTOR

CROSS-REFERENCE TO RELATED APPLICATIONS

The present application is related to a Provisional Application, Serial No. 60/191,122, filed Mar. 22, 2000, entitled SPRINKLER HEAD AND RISER PROTECTOR.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention is concerned with the field of underground irrigation systems and particularly with sprinkler head and riser protector devices.

2. Related Art

An underground irrigation or sprinkling system is comprised of a series or network of pipes that is buried below grade. The piping network is connected to a source of water, which is distributed through the network and then to a series of risers and attached sprinkler heads. The risers are connected perpendicularly to the piping network at regular geographic intervals in order to provide an even distribution of water over and upon a ground surface. The sprinkler heads are fitted in sliding engagement within the risers and are maintained in a retracted configuration during the absence of water pressure at approximately ground level. Upon activation of water pressure, the sprinkler heads pop up or extend for some distance above the top edge of the riser and round surface at a height sufficient for the spray nozzle of the sprinkler head to provide uniform distribution of water upon the ground surface. The risers are usually manufactured of polyvinylchloride (PVC) plastic material, and the sprinkler heads of a variety of metal or metallic materials.

A common problem with such irrigation systems is that the sprinkler heads can be damaged by impacts or collisions resulting from contact with lawn equipment, people, etc. If the sprinkler head is not directly damaged, it is possible that the force of any such impact will be transmitted to the riser and thus damages the riser or its connection to the water pipe and sprinkler head.

Numerous designs for sprinkler head and riser guards or protectors have been provided in the prior art. Even though these designs may be suitable for the specific individual purposes to which they address, they still have disadvantages. For instance, U.S. Pat. No. 4,582,256 discloses a device that is pressed into the ground surface surrounding a particular sprinkler head and riser. As the device is not anchored or secured, it may be susceptible to lateral movement after repeated impacts and thus impinge upon the sprinkler head and riser, thereby damaging and interfering with operation of said sprinkler head and riser. U.S. Pat. No. 4,763,838 relates to a sprinkler having an improved guard located in the upper end of the sprinkler body between the sprinkler body and nozzle body. As disclosed, this guard provides minimal protection from the impacts and collisions the subject invention is designed to prevent.

As such, it may be appreciated that there is a continuing need for a new and improved sprinkler head and riser protector that substantially reduces the probability of any impact and collision from making contact with a sprinkler head and riser and additionally is provided with means to retain its original position in relation to a particular sprinkler head and riser after installation.

BRIEF SUMMARY OF THE INVENTION

In one aspect of the present invention there is provided a protective device for a riser connected to an underground water pipe and a sprinkler head attached at a top portion thereof, such device including an elongate hollow body member having an upper portion with an upper opening and a lower portion with a lower opening, each opening being defined by a rim on respective upper and lower portion. The body defines an interior space for housing a riser and sprinkler head therein and has a lower portion including a pair of slots formed therein for fitting the body member over an underground water pipe and an upper portion further including a concave hood member extending laterally outwardly and downwardly of the rim of the upper opening and defining a cavity. The hood member has a lower edge portion for engaging a ground surface to limit downward travel of the device. The slots have an open lower portion and an arcuate upper portion for engaging the upper surface of an underground water pipe. The hood member has a smooth upper surface to deflect an impact with movable objects to minimize lateral movement of the device upon such impact. The hood member includes a medially located opening having a rim co-joining the rim of said upper opening of the body member. The slots are oppositely aligned and the openings are also aligned. The lower edge portion is located in a plane located beneath an underground water pipe. The device also includes a plurality of spaced flanges extending beneath the hood member and engaged with the body member to inhibit rotative motion of the hood member by positioning the flanges into a ground surface.

In another aspect of the present invention the protective device upper portion further includes a head member extending laterally outwardly and downwardly of the rim of the upper opening for engaging a ground surface to limit downward travel of the device. The slots have an open lower portion and an arcuate upper portion for engaging the upper surface of an underground water pipe. The head member includes a downward concave hood portion defining a cavity therein and the hood portion has a lower edge portion further defining the cavity. The hood portion has a smooth upper surface to deflect impacts with movable objects to minimize lateral movement of the device upon such impacts. The hood portion also includes a medially located opening having a rim co-joining the rim of the upper opening of the body member. The body is formed substantially as an elongate cylinder with the slots oppositely aligned and the openings aligned. The lower edge portion of the device is located in a plane located beneath an underground water pipe.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Introduction

Figure 1:
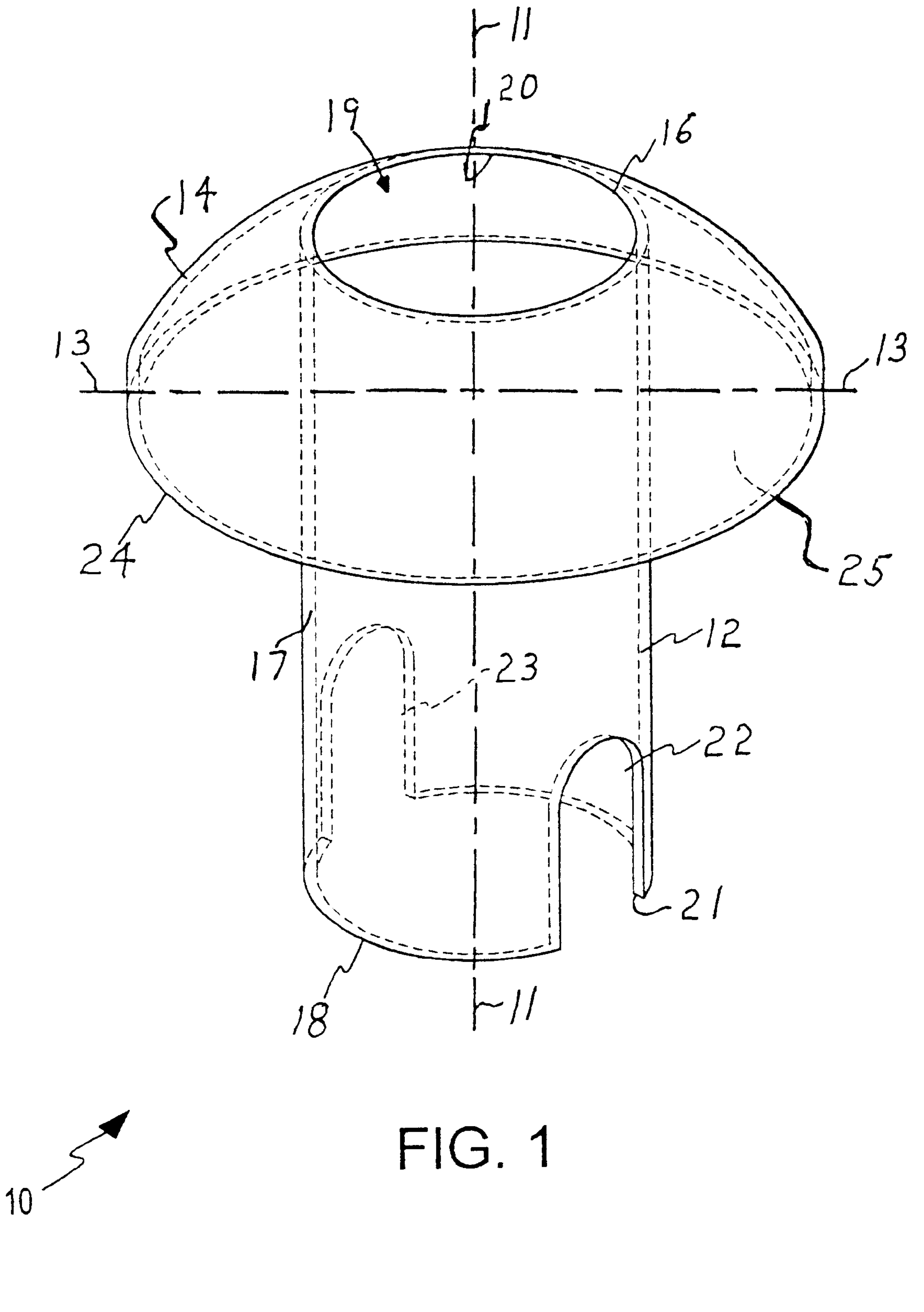
FIG. 1 is a perspective view of a sprinkler head and riser protector in accordance with the invention.

Described briefly, according to a typical embodiment, the invention presents a sprinkler head and riser protector that is designed to be fitted over and around a typical sprinkler head and riser that are perpendicularly attached to an underground water pipe. The protector essentially is designed to receive and absorb any jolts, collisions, or impacts that may be encountered while a sprinkler head and riser are attached to an underground water pipe in order that said sprinkler head and riser are prevented from becoming damaged by said jolts, collisions, or impacts such as that generated by contact with lawn equipment, transport devices, and pedestrians. The protector, which can be manufactured as a unitary, one-piece device or from at least two components using conventional molding or injection processes, is comprised of a cylindrical member that is joined in perpendicular relation to a curved, cover member so that the protector resembles a mushroom in shape and appearance. The protector can be manufactured of a material that is lightweight, durable and economical to acquire and manufacture, such as high-impact plastic and the like. The cylindrical member is hollow with a central bore or cavity and openings formed at opposing ends that permit access to the bore or cavity enclosed therein. The cylindrical member is joined at one end to the cover member so that an opening of the cover member conjoins an opening of the cylindrical member. The cover member is further constructed with a perimeter rim or edge that is disposed below the opening of the cylindrical member. In this manner, the cover member forms an interior cavity with access thereto gained from the underside of the cover member. The end of the cylindrical member opposite to the end attached to the cover member is comprised of two arch-shaped slots that are disposed in opposing relation within the sidewall of the cylindrical member.

The protector is fitted over a sprinkler head and riser by positioning the cylindrical member directly above a particular sprinkler head and riser with care taken to align the slots of the cylindrical member with the direction of the underground water pipe. The cylindrical member is pressed into the ground until the slots receive a corresponding section of underground water pipe and the associated sprinkler head and riser are centrally disposed within the interior of the cylindrical member. As the protector is inserted within the ground surface, the interior cavity of the cover member becomes substantially filled with ground surface material, thereby serving to check additional downward motion of the protector. The protector is retained in place by the ground surface material received and compacted within the interior cavity of the cover member and the water pipe accommodated within the slots of the cylindrical member.

It is an object of the present invention to provide a low-cost, easy-to-manufacture, and easy-to-market sprinkler head and riser protector. A further object of the invention is to provide an easy-to use and versatile sprinkler head and riser protector. In addition, the invention provides a combination sprinkler head and riser protector that prevents damage to a sprinkler head and riser resulting from impacts, collisions, or contact with lawn equipment, transport devices, or pedestrians. Finally, the invention provides a sprinkler head and riser protector that is anchored or secured in place by a cavity under cover member that accommodates a portion of ground surface compacted therein and two slots that are fitted over a portion of underground water pipe adjacent to an associated sprinkler head and riser.

Description

Referring now to the drawings, and in particular, to FIG. 1, there is illustrated a typical embodiment of the sprinkler head and protector 10. The present version of the invention 10 consists of a device to protect sprinkler heads and risers that are attached to underground water pipes from damage resulting from collisions or impacts with lawn equipment, transport devices such as golf carts, and pedestrians, etc. The protector 10 is a one-piece device that is constructed as a unitary device involving hot injection molding processes or as several components joined together as an integrated load bearing apparatus. The protector 10 is fabricated of lightweight material that is durable and resistant to corrosion, oxidation, and deterioration that may otherwise result from continual exposure to moisture and various soil and ground surface elements. In this respect, the protector 10 may be comprised of high-impact resistant plastic, fiberglass, various composite materials, and the like.

Figure 2:
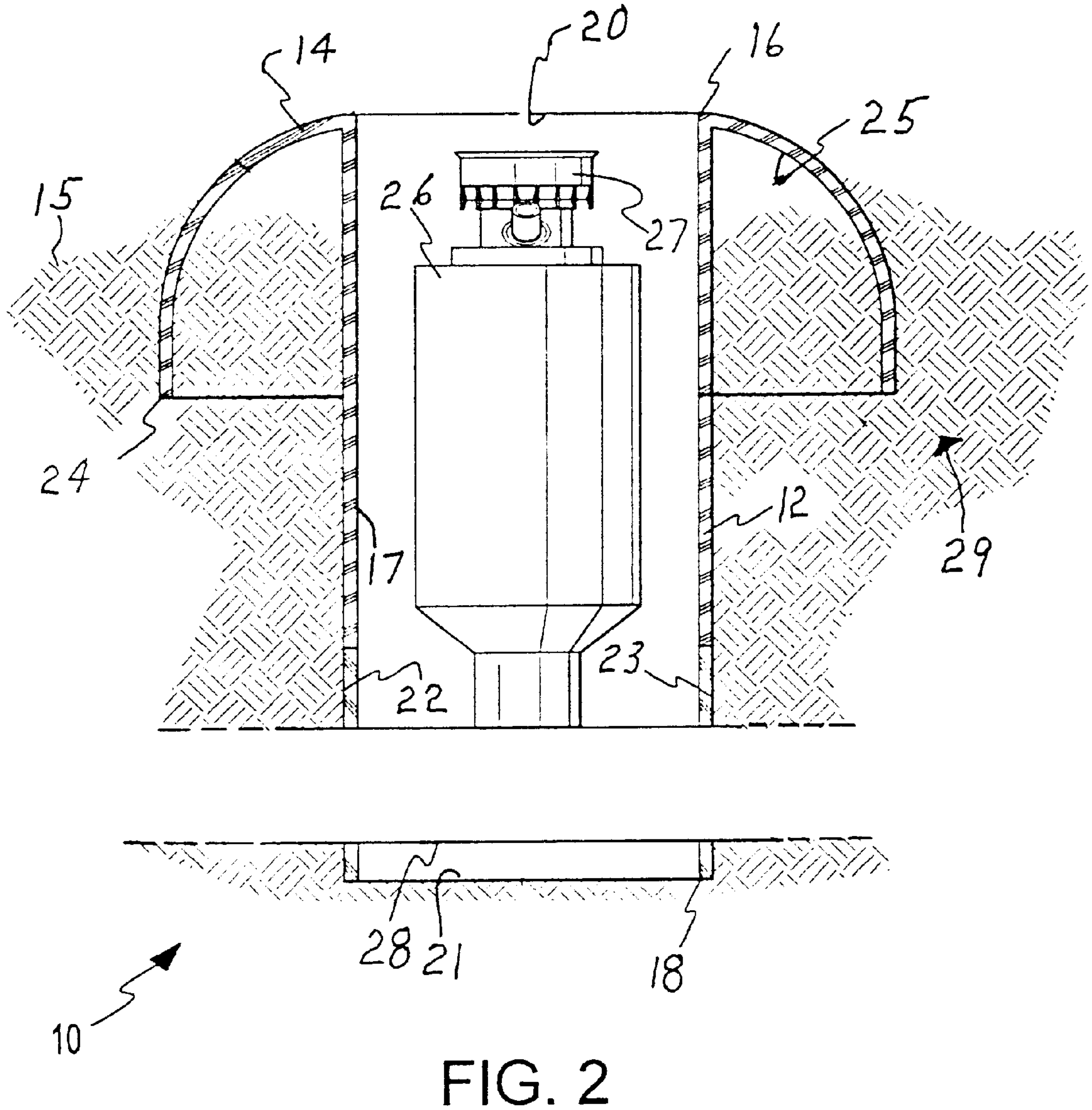
FIG. 2 is a cross-section view of a sprinkler head and riser protector of FIG. 1 fitted over a sprinkler and portion of connected pipe within a ground surface.

The sprinkler head and riser protector 10 consists of an elongate, hollow vertical member 12 that is attached in perpendicular relation to a horizontal hood member 14. These components 12, 14 are so designated because it is intended that once the protector 10 is disposed within a ground surface 15, as seen in FIG. 2, the longitudinal axis 11 of the vertical member 12 will be aligned perpendicularly to said ground surface, and the axis 13 of the hood member 14 will be aligned in parallel to said ground surface 15. The vertical member 12 is cylindrical in shape having body 17 and a first circular rim 16 and a second circular rim 18. The first rim 16 defines an upper opening 20, and the second rim 18 defines a lower opening 21. The openings 20, 21 allow access to a cavity or bore 19 within the vertical member 12. Two slots 22, 23 are formed in opposing relation within the body 17 of the vertical member 12 proximate to the second rim 18. These slots 22, 23 are arch shaped in appearance and construction so that the arched or circular portion thereof can conform to a corresponding section of water pipe. The horizontal member 14 is circular in shape when viewed from a top or plan view and slopes downward from upper rim 16 to a lower circular rim 24. The lower circular rim 24 corresponds to the greatest circumference of the horizontal member 14 and represents the outer boundary of a cavity 25 formed within and defined by the underside of the horizontal member 14.

Referring to FIG. 2, therein illustrated is the protector 10 fitted over a riser 26, sprinkler head 27, and underground water pipe 28. The sprinkler head 27 is displayed in the retracted position and is generally parallel to a ground surface 15. The vertical member 12 is centrally aligned over and around the riser 26 so that the riser 26 and sprinkler head 27 are completely enclosed by the vertical member 12 and any two portions of an exterior side wall of the riser 26 are in equidistant relation to the inside surface of the vertical member 12. In this respect, the sprinkler head 27 is disposed below the first or upper rim 16 of the vertical member 12. The water pipe 28 is received within the slots 22, 23 of the vertical member 12, and a portion of ground surface 15 is enclosed or contained within the cavity 25 of the horizontal member 14. In this manner, the combination of the vertical member 12 and horizontal member 14 prevent the riser 26 and sprinkler head 27 from impacts, or collisions emanating from vertical, lateral, and oblique directions or sources and damage resulting therefrom. The protector 12 is generally impervious to dislocation from its installed position by the quantity of compacted ground 29 contained within the cavity 25 of the horizontal member 14, the snug engagement of the vertical member 12 within the ground surface 15, and the disposition of the water pipe 28 within the slots 22, 23.

Figure 3:
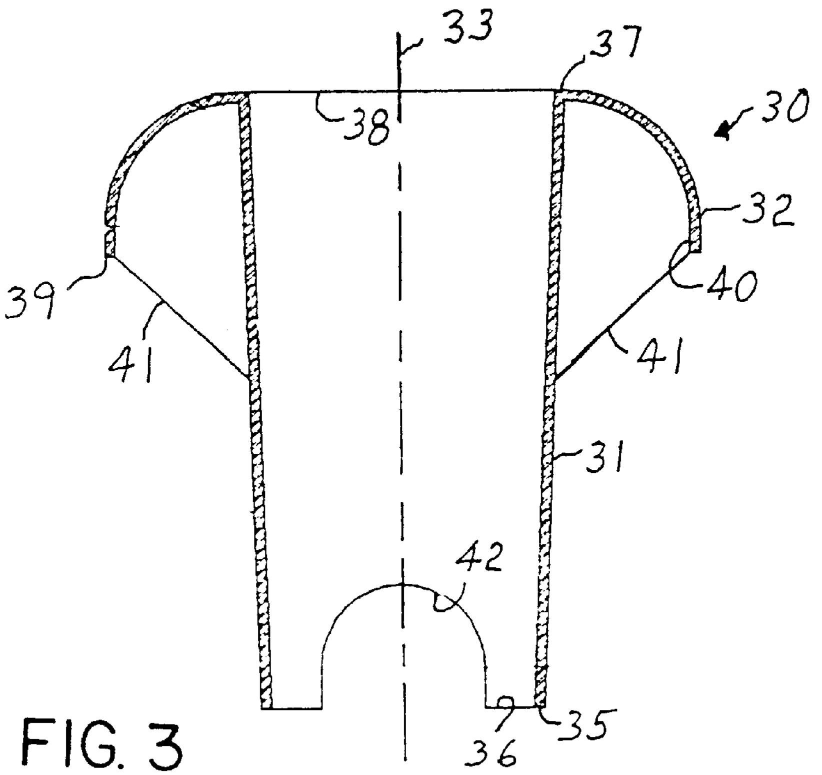
FIG. 3 is a cross-section view of an alternative embodiment of the invention.
Figure 4:
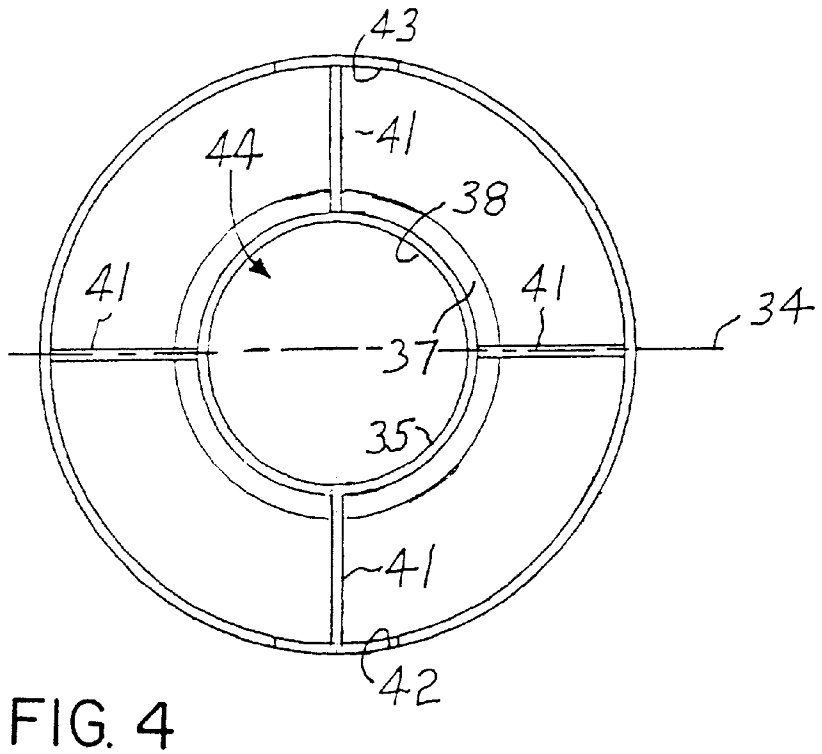
FIG. 4 is a top view of the protector of FIG. 3.

FIGS. 3 and 4 illustrate an alternative, preferred embodiment of the protector 30. Vertical body member 31 is elongate and generally cylindrical in shape and includes a lower rim 35 defining a lower opening 36 that is smaller than the upper opening 38 defined by rim 37. Rim or edge 39 of hood member 32 defines cavity 40.

Four flanges 41 separated at 90° angles are tapered into body member 31. Slots 42 and 43 are aligned across the lower portion of body 31 and engage the upper surface of an underground water pipe such as 28.

Flanges 41 provide greater resistance to movement of the device 30 with respect to axis 33 than would the device 10 of FIGS. 1 and 2, because the flanges would have to move against ground material 29. Slots 42 and 43 also provide resistance to lateral movement about axis 34. The larger upper portion of device 30 provides for greater clearance between body 31, riser 26 and head 27.

The principal means by which devices 10 and 30 would make contact with a riser 26 and head 27, located in respective space 19 or 44 is collision with a lawnmower blade or similar apparatus. The present protective device 10 and 30 provides for less movement of the device upon impact with a moving object than do the prior art devices. In addition, the strength of the flanges 41, functioning as ribs, act to reinforce hood member 32, thus allowing for the use of thinner material if appropriate in the circumstances.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved sprinkler head and riser protector has been provided. The invention is relatively simple and easy to manufacture, yet affords a variety of uses. While the description contains much specificity, these should not be construed as limitations on the scope of the version of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A protective device for a riser connected to an underground water pipe and sprinkler head attached at a top portion thereof comprising an elongate hollow body member having an upper portion with an upper opening and a lower portion with a lower opening of sufficient size to allow for free passage of a riser and sprinkler head therethrough, each said opening being defined by a rim on respective said upper and lower portion, said body defining an interior space for housing a riser and sprinkler head therein, said space being formed of a sufficient size to be spaced away from a riser and sprinkler head to prevent contact between said body and a riser and sprinkler head in response to an impact on said device by a moving object, said lower portion including a pair of slots formed therein and having open lower portions for positioning said body member over an underground water pipe, said upper portion further including a concave hood member extending laterally outwardly and downwardly of said rim of said upper opening and defining a cavity, said hood member having a lower edge portion for engaging a ground surface to limit downward travel of said device.

2. The device as defined in claim 1 wherein each of said slots has an arcuate upper portion for conforming to an upper surface of an underground water pipe.

3. The device as defined in claim 1 wherein said hood member has a smooth upper surface to deflect an impact with movable objects to minimize lateral movement of said device upon such impact.

4. The device as defined in claim 1 wherein said hood member includes a medially located opening having a rim co-joining said rim of said upper opening of said body member.

5. The device as defined in claim 1 wherein said slots are oppositely aligned.

6. The device as defined in claim 1 wherein said openings are aligned.

7. The device as defined in claim 1 further comprising a plurality of spaced flanges extending beneath said hood member and engaged with said body member to inhibit rotative motion of said hood member by positioning said flanges into a ground surface.

8. The device as defined in claim 1 wherein said lower edge portion is located in a plane located beneath an underground water pipe.

9. The device as defined in claim 1 wherein said lower edge portion is located in a plane located beneath an underground water pipe.

10. A protective device for a riser connected to an underground water pipe and sprinkler head attached at a top portion thereof comprising an elongate hollow body member having an upper portion with an upper opening and a lower portion with a lower opening of sufficient size to allow for free passage of a riser and sprinkler head therethrough, each said opening being defined by a rim on respective said upper and lower portion, said body defining an interior space for housing a riser and sprinkler head therein, said space being formed of a sufficient size to be spaced away from a riser and sprinkler head to prevent contact between said body and a riser and sprinkler head in response to an impact on said device by a moving object, said lower portion including a pair of slots formed therein and having open lower portions for positioning said body member over an underground water pipe, said upper portion further including a head member extending laterally outwardly and downwardly of said rim of said upper opening for engaging a ground surface to limit downward travel of said device.

11. The device as defined in claim 10 wherein said slots have an open lower portion and an arcuate upper portion for conforming to an upper surface of an underground water pipe.

12. The device as defined in claim 10 wherein said head member includes a downward concave hood portion defining a cavity therein, said hood portion having a lower edge portion further defining said cavity.

13. The device as defined in claim 11 wherein said head member has a smooth upper surface to deflect impacts with movable objects to minimize lateral movement of said device upon such impacts.

14. The device as defined in claim 10 wherein said body is formed substantially as an elongate cylinder.

15. The device as defined in claim 10 wherein said slots are oppositely aligned.

16. The device as defined in claim 10 wherein said openings are aligned.

17. The device as defined in claim 9 further comprising a plurality of spaced flanges extending beneath said head member and engaged with said body member to inhibit rotative motion of said head member by positioning said flanges into a ground surface.

18. The device as defined in claim 11 wherein said head member includes a medially located opening having a rim co-joining said rim of said upper opening of said body member.

19. A protective device for a riser connected to an underground water pipe and sprinkler head attached at a top portion thereof comprising a hollow body member having an upper portion having an upper opening and a lower portion having a lower opening of sufficient size to allow for free passage of a riser and sprinkler head therethrough, each said opening defined by a rim on respective said upper and lower portion, said body defining an interior space for housing a riser and sprinkler head therein, said space being formed of a sufficient size to be spaced away from a riser and sprinkler head to prevent contact between said body and a riser and sprinkler head in response to an impact on said device by a moving object, said lower portion including a pair of slots formed therein and having open lower portions for positioning said body member over a water pipe, said upper portion further including a downward concave hood member extending laterally outwardly of said rim of said upper opening and defining a cavity, said hood member having a plurality of spaced flanges and having a lower edge portion further defining said cavity for receiving and compacting ground material therein to limit downward travel of said device and to minimize lateral movement of said device in response to an impact of said device by a moving object.

20. The device as defined in claim 14 wherein said slots have an open lower portion and an arcuate upper portion for engaging the upper surface of an underground water pipe to inhibit movement of said device and to inhibit contact between said device and a riser and sprinkler head locatable within said interior space in response to an impact on said device by a moving object.

* * * * *